Figure 1A:
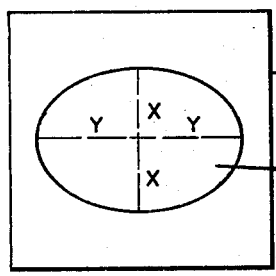

Sept. 8, 1959      H. J. FELDHAKE      2,902,777
MATHEMATICAL FORMULA DEMONSTRATOR Filed March 27, 1959      4 Sheets-Sheet 1

*INVENTOR.*
HERBERT J. FELDHAKE
*BY*
Lawrence S Epstein
*ATTORNEYS*

Sept. 8, 1959  H. J. FELDHAKE  2,902,777
MATHEMATICAL FORMULA DEMONSTRATOR
Filed March 27, 1959  4 Sheets-Sheet 2

*INVENTOR.*
HERBERT J. FELDHAKE
BY
*Lawrence S. Epstein*
*ATTORNEYS*

Sept. 8, 1959 H. J. FELDHAKE 2,902,777
MATHEMATICAL FORMULA DEMONSTRATOR
Filed March 27, 1959 4 Sheets-Sheet 3

*INVENTOR.*
HERBERT J. FELDHAKE
BY
*Lawrence S. Epstein*
ATTORNEYS

Sept. 8, 1959   H. J. FELDHAKE   2,902,777
MATHEMATICAL FORMULA DEMONSTRATOR
Filed March 27, 1959   4 Sheets-Sheet 4

*INVENTOR.*
HERBERT J. FELDHAKE
BY
*Lawrence S. Epstein*
ATTORNEYS

United States Patent Office 2,902,777
Patented Sept. 8, 1959

2,902,777

MATHEMATICAL FORMULA DEMONSTRATOR

Herbert J. Feldhake, Chicago, Ill.

Application March 27, 1959, Serial No. 802,580

19 Claims. (Cl. 35—34)

(Granted under Title 35, U.S. Code (1952), sec. 266)

The invention described herein may be manufactured and used by or for the Government of the United States of America for governmental purposes without the payment of any royalties thereon or therefor.

This invention relates to a device providing a physical meaningful demonstration of mathematical formulas and, in particular, of mathematical formulas containing second and third order terms such as the formula for the area of an ellipse. This invention is a continuation-in-part of applications, Serial Nos. 612,337, filed September 26, 1956, 657,465 filed May 6, 1957 and 657,460 filed May 6, 1957.

Mathematics is an abstract subject which is generally taught by means of symbols and figures drawn upon a blackboard. It is a well-known fact that many pupils find it difficult to learn by this method, but are aided in their learning by physical demonstrations of the properties of abstract principles and geometrical forms.

The present invention provides a device for demonstrating the physical meaning of mathematical formulas containing terms of the area and volume type (second and third order terms). Terms on one side of the formula are represented by areas of volumes formed in a containing structure preferably fabricated from transparent plastic material. Terms on the other side of the formula are represented by other areas or volumes of simple, easily comprehended, geometrical forms, such as squares, rectangles or cubes, equivalent in total area or volume, respectively, to the total area of volume of the terms on the first side of the formula. The areas or volumes representing the terms on one side of the formula communicate with those on the other side. A freely mobile fluid material, preferably spherical pellets, covers the total area or fills the total volume representing the terms on one side of the formula. Equivalence of both sides of the formula is demonstrated by transferring the fluid material to the areas or volumes corresponding to the terms on the other side of the formula.

An object of the invention is to provide a device particularly useful in teaching mathematics.

Another object is to provide a device capable of furnishing a physically meaningful demonstration of a mathematical formula containing second or third order terms.

A further object is to provide a device capable of furnishing a physically meaningful demonstration of the formula for the area of an ellipse.

A further object is to provide a device capable of furnishing a physically meaningful demonstration of the formula for the area of a circle.

A further object is to provide a device capable of furnishing a physically meaningful demonstration of the formula for the area of a parallelogram.

Still another object is to provide a device which enables students to more quickly and easily understand the meaning of certain mathematical formulas and to remember them for a longer period of time.

Figure 1B:
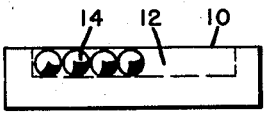
Figure 1C:
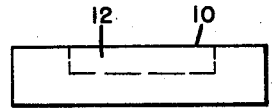
Figure 2A:
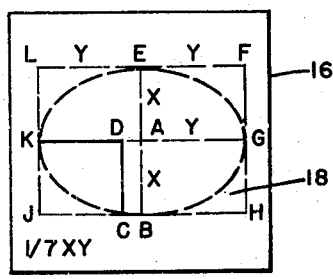
Figure 2B:
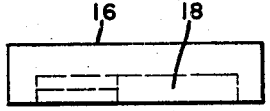
Figure 2C:
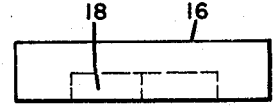
Figure 3:
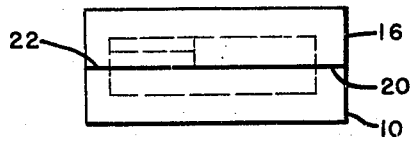
Figure 4:
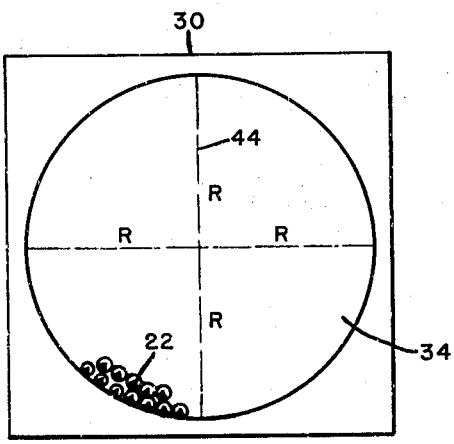
Figure 5:
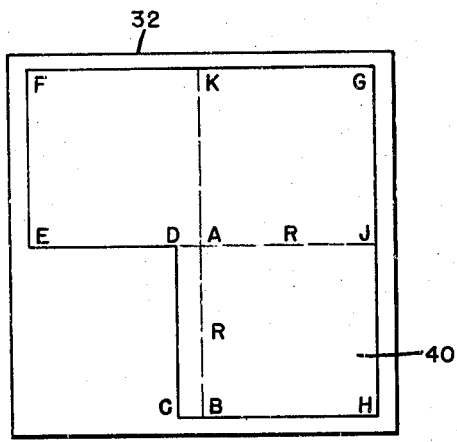
Figures 6, 7:
Figure 8:
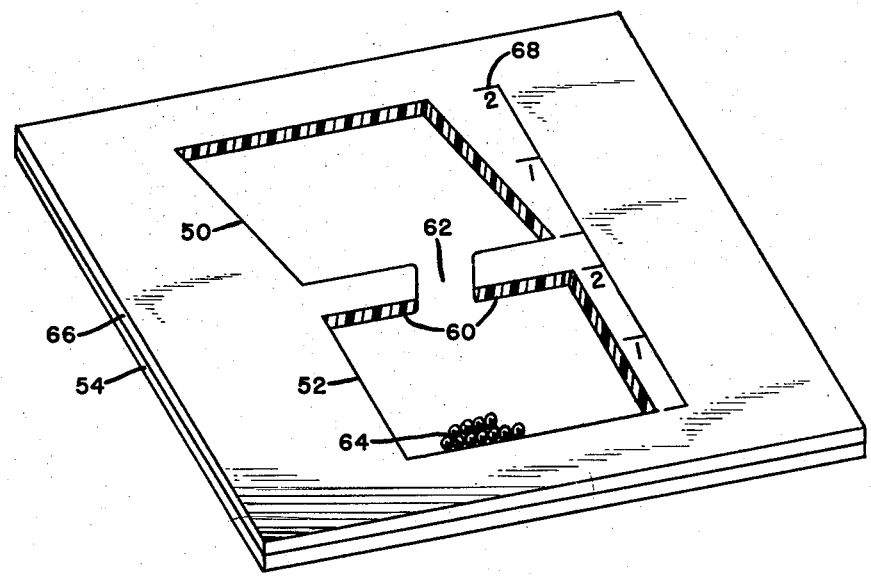
Figure 9:
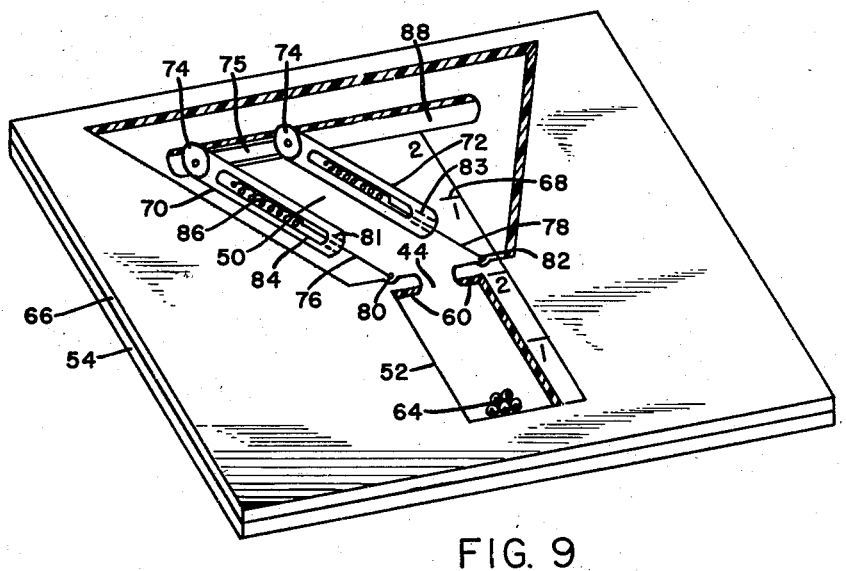
Figure 10:
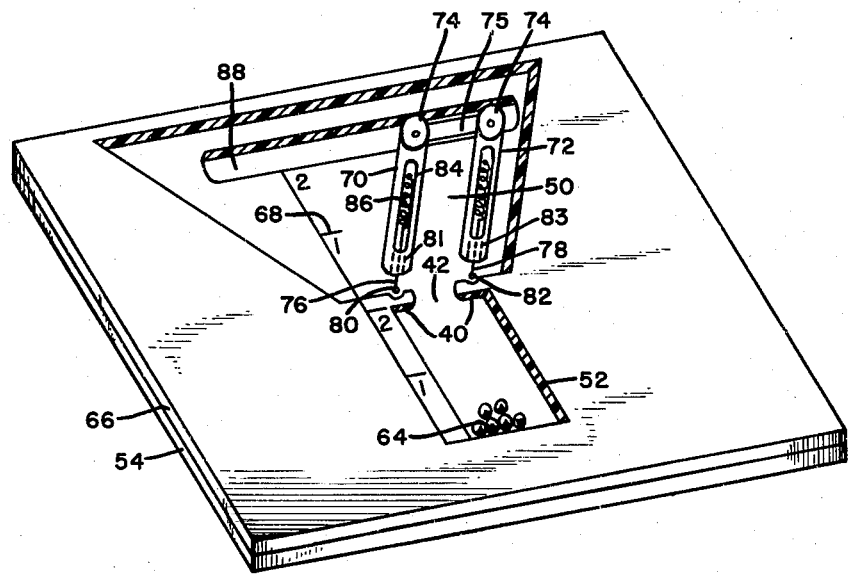

Other objects and many of the attendant advantages of this invention will be readily appreciated as the same becomes better understood by reference to the following detailed description when considered in connection with the accompanying drawings wherein:

Fig. 1a is a plan view showing the bottom of the lower section of an embodiment of the invention, Fig. 1b is a front view of the lower section of the embodiment, Fig. 1c is a side view of the lower section of the embodiment, Fig. 2a is a plan view of the top of the upper section of the embodiment, Fig. 2b is a front view of the upper section of the embodiment, Fig. 2c is a side view of the upper section of the embodiment, Fig. 3 is a front view showing how the two sections are assembled, Fig. 4 is a plan view of the lower section of an embodiment of the invention, as viewed from above, Fig. 5 is a plan view of the upper section of the embodiment, as viewed from below, Fig. 6 is a front view of Fig. 4, Fig. 7 is a front view of Fig. 5, Fig. 8 is a perspective view of an embodiment of the invention, Fig. 9 is a perspective view of a preferred embodiment of the invention in which the shape of the parallelogram is variable, and Fig. 10 is a perspective view of the embodiment of Fig. 9, in which the arms of the parallelogram are shown in another position.

Figs. 1a, 1b and 1c constitute a set of mechanical drawings showing the lower section of an embodiment of the invention which comprises a board 10 in the shape of a square containing a centrally excised region 12 shaped in the form of an ellipse. The excised portion 12 does not extend completely through the width of the board 10, as is apparent in Figs. 1b and 1c, but is at least deep enough to accommodate spherical balls or pellets 14. Any other peripheral shape which will accommodate the elliptical excision 12 may be employed.

The dotted lines of Fig. 1a denote the major and minor axes of the ellipse, the sections marked Y each being equal to one-half the major axis and the sections marked X each being equal to one-half the minor area.

Figs. 2a, 2b and 2c constitute a set of mechanical drawings showing the upper section of this embodiment of the invention. A board 16 preferably of the same peripheral shape as the lower board 10 contains an excised central region 18 denoted by the line LFHCDK. The depth of the excision 18 preferably equals the depth of the elliptical excision 12 in the lower board 10.

The dimensions of the excised portion 18 in the upper board 16 are as follows: Side LF equals the major axis of the ellipse and side FH equals the minor axis of the ellipse. Thus, $LE=EF=BH=Y$ and $LK=FG=GH=CD=X$. The small line $BC=\frac{1}{7} BH=\frac{1}{7} Y$. Therefore, the quasi-rectangular excised region 18 may be considered to be composed of four rectangles AKLE, AEFG, AGHB and ABCD. The area of each of the first three rectangles is XY; the area of the last rectangle is $\frac{1}{7} XY$. Thus, the total area of the excised portion 18 is $3\frac{1}{7} XY$.

This area is equal to the area of an ellipse, however, since the formula for the area of an ellipse is $\pi$ ($\frac{1}{2}$ major axis) ($\frac{1}{2}$ minor axis) or $\pi$ times one-half of the major axis times one-half of the minor axis.

$\pi$ is a constant having the value of 3.14159 or approximately $3\frac{1}{7}$. The formula therefore may be written $3\frac{1}{7}(Y)(X)$ or $3\frac{1}{7}XY$. The lower and upper excised portions 12 and 18 therefore have equal areas.

Both boards preferably are fabricated from transparent plastic, although other suitable materials, such as glass, wood or metal may be employed.

To use the invention, the lower excised portion 12 is completely covered by spherical pellets 14, only a few of which are illustrated in Fig. 1b. The pellets 14 may comprise marbles, buckshot, etc., although any freely mobile fluid material such as sand or colored liquid may be employed.

If the pellets 14 are employed, the excised portion 12 is covered by a single layer. If sand or a liquid is used, it is desirable to fill the complete volume of the excised region 12. The depths of both excisions 12 and 18 must then be equal or the equality of the areas cannot be demonstrated satisfactorily.

The upper board 16 may be secured permanently or temporarily to the lower board 10 as shown in Fig. 3. This may be accomplished by any suitable mechanical means, such as clamps, or may be done by hand. The contiguous surfaces 20 and 22 should be substantially flat to prevent escape of the freely mobile material. The upper and lower sections 16 and 10 should preferably be fitted together so that the excised portions 12 and 18 are positioned with respect to each other as shown in Fig. 2a by the dotted ellipse KEGB. However, if the flat areas of the boards 10 and 16 are sufficiently extensive to cover the excised regions 18 and 12, the latter may be coincident only to the limited extent of providing a passage large enough for the pellets 14 or other mobile material to be transferred between the excised regions 18 and 12.

To illustrate the equality of the excised portions 12 and 18, the assembled device is inverted. This transfers the pellets 14 from the elliptical excised portion 12 to the quasi-rectangular excised portion 18, the area of which becomes completely covered as was the area of the elliptical excised portion 12 just a moment before.

The embodiment of the invention shown in Figs. 4–7 consists of a structure comprising a lower and an upper section, 30 and 32 respectively. The two sections are preferably formed from flat, square-shaped boards although sections of any peripheral shape may be utilized.

A circular area 34 is excised from the lower section 30. This excised area 34 extends from the top surface 36 of the lower section 30 partially through the depth of the board, as is more clearly seen in Fig. 6.

The upper section 32 is formed with a hexagonal excised area CDEFGH (see Fig. 5) extending from its lower surface 38 (see Fig. 7) partially through the board. (Note that Fig. 5 is a plan view of the upper section as viewed from the lower surface 38.) This excised area 40 (CDEFGH) may be considered to be composed of three squares ADEFK, AKGJ, AJHB and a rectangle, ABCD. The sides of each square are equal to R, the radius of the circular area in the lower board. Two sides of the rectangle ABCD, are also equal to R, the other two sides being equal to $\frac{1}{7}R$.

The boards 30 and 42 preferably are fabricated from a transparent material such as transparent plastic or glass, although other materials such as wood, metal, etc., may be employed.

Freely mobile material, preferably spherical pellets 42 such as marbles, buckshot or metal balls, is placed within the circular excised area 34. The freely mobile material may also be a fluid such as sand or a colored liquid.

If pellets 42 are employed, it is preferable to utilize a quantity sufficient to completely cover the circular area 34 with only a single layer. Thus, the selected pellets 42 may have a diameter only slightly less than the depth of the excised area. However, if the pellet diameter is small compared to the depth of the excision, a quantity sufficient to fill the volume of the excised circle to the level of the top surface of the board may be utilized.

If the boards 30 and 32 are fabricated from transparent material, they may be affixed together in a permanent manner so as to form a single integrated structure.

If the boards are fabricated from a non-transparent material, temporary means are employed to clamp the boards together. The arrow between Figs. 6 and 7 indicates that surfaces 36 and 38 are in contact with each other when the device is assembled.

If desired, marker lines 44 indicating the radii of the circle and dividing the hexagonal area into squares and a rectangle may be inscribed by any convenient means upon the inner or outer surfaces of the boards if they are transparent, or upon the inner surfaces if they are non-transparent. These may be employed as dimension indicators as well as area delimiters.

The formula for the area of a circle is $\pi R^2$, where $\pi$ is a mathematical constant equal to $3\frac{1}{7}$ and R is the radius of the circle. Thus, the area of a circle equals $3\frac{1}{7}R^2$ or $3R^2 + \frac{1}{7}R^2$. The area of each square is $(R)(R)$ or $R^2$, wherefore the total area of the three squares is $3R^2$. The area of the rectangle is $(\frac{1}{7}R)(R)$ or $\frac{1}{7}R^2$. Thus, the combined area of the three squares and the rectangle CDEFGH equals $3\frac{1}{7}R^2$ and this is identical to the area of the circle.

To demonstrate this equivalence of areas, the structure is assembled with the pellets 42 in the circular area 34. The structure is then inverted and the pellets 42 are transferred to the hexagonal area 40. The pellets 42, which had previously completely covered the circular area 34, can now be seen to completely cover the hexagonal area 40, thus proving that the two areas are equal.

If a fluid is employed, a sufficient quantity is inserted to completely occupy the volume associated with the circular area 34. Upon inversion of the device, the fluid can be seen to completely occupy the volume associated with the hexagonal area 40.

Fig. 8 illustrates an embodiment of the invention in which a parallelogrammic area 50 and a rectangular area 52 are excised from the flat upper surface of a board 54 which may assume any peripheral shape. The bases of the parallelogram 50 and the rectangle 52 are of equal dimension and substantially coincident in this embodiment, although they may be more widely separated. The excisions do not extend completely through the depth of the board 54.

A pair of partitions 60 extend inwardly from the sides of the excised area at the junction of the base of the parallelogram 50 and the top of the rectangle 52. These partitions 60 are not absolutely necessary but are preferable. An aperture 62 is left between the partitions to provide a communicating passageway between the parallelogrammic and rectangular areas 50 and 52.

Freely mobile material, preferably in the form of spherical pellets 64 such as marbles, buckshot or ball bearings, is placed within the excised areas. The freely mobile material may also be a fluid such as sand or colored liquid.

If pellets 64 comprise the freely mobile material, it is preferable to employ a sufficient quantity to completely cover the parallelogrammic area 50 with a single layer; otherwise, a sufficient quantity of material to completely fill the volume of the excised parallelogram to the level of the upper surface of the lower board 54 should be utilized.

The lower board 54 is covered by a transparent upper board 66, or rigid sheet, of transparent material sufficient in extent to cover the excised area in the lower board 54. If the freely mobile material employed as a fluid, a leak-proof junction must be formed between the two boards; otherwise, a simple temporary clamp may be used. The lower board 54 may be fabricated from any suitable material such as wood, plastic, metal, etc. The upper board 66 preferably is fabricated from a transparent material such as transparent plastic or glass.

if a permanent junction is formed between the boards, at least one must be transparent.

Measuring lines 68 may be marked upon the surface of the upper or lower board to indicate the altitudes of the parallelogram 50 and the rectangle 52.

The formula for the area of a parallelogram is BA, where B equals the base and A equals the altitude of the parallelogram. As is apparent, the base of the parallelogram 50 and the base of the rectangle 52 are identical and their altitudes are equal. Thus, the area of the parallelogram is equal to the area of the rectangle.

To demonstrate the equivalence of these areas, the structure is tilted until the parallelogrammic area 50 is completely covered by the pellets 64. The structure is then inverted and all of the pellets 64 are transferred to the rectangular area 52. The rectangular area 52 is now completely covered by the pellets 64.

The embodiment shown in Fig. 9 is a more generalized form of the invention in which the shape of the parallelogram 50 can be varied while the base and altitude dimensions are maintained constant.

Two sides of the parallelogram 50 are formed by two arms 70 and 72 and a pair of arm extensions 76 and 78, each associated with a different one of the arms. The arm extensions may comprise any suitable material such as wire, cord, etc., or even a rigid material such as a metal rod. Each arm is pivotally attached at one end to a different end of a slide arm 75 which comprises that side of the parallelogram 50 lying opposite the base.

The arm extensions 76 and 78 protract from the lower ends of the arms to pivot points 80 and 82 respectively, one pivot point being located at each end of the base of the parallelogram 50. The base of the parallelogram 50, which is identical in size with the base of the rectangle 52, comprises the partitions 60 and the aperture 62 and extends from one pivot point 80 to the other 82. A longitudinal slot 84 in the central region of each arm mounts and retains a spring 86 which is attached to the arm near its pivotal end. The arm extensions from the base pivot points run through passages drilled through the arms from the ends nearest the base pivot points to the ends of the slots. These arm extensions may consist of elongated rods secured to the spring ends or may even comprise extensions of the spring itself.

Another slot 88 in the upper board 66 runs parallel to the base of the parallelogram 50 and is longer than the base. The slide arm pivots 74 extend upward through the slide-arm slot 88, the movements of the slide arm 75 being constrained by said slot 88 along a line parallel to the base.

The movements of the slide arm 75 may be constrained by other means, as by extending the pivot shafts of the pivots 74 downward into a slot cut in the lower board 54. The function of the upper slot 88 would then be merely to permit access to the slide 75 so that it may be moved.

The slide arm 75 is supported by flanges projecting from the slide-arm pivots 74 and resting upon the upper surface of the upper board 66, although it may be designed to slide or roll along the bottom of the excised area. The slide arm 75 may be moved to any point along the slide-arm slot 88, thereby changing the angles and shape of the parallelogram 50. As the positions of the arms 70 and 72 are altered, the lengths of the arm extensions 76 and 78 from the ends of the arms to the base pivot points 80 and 82 change correspondingly, the arm extensions being maintained in taut condition by the tension of the springs 86.

The manner in which a change in the position of the slide arm 75 alters the shape of the parallelogram 50 is shown in Fig. 10. Note that although the shape of the parallelogram 50, its angles and the lengths of its sides change, the base and altitude dimensions always remain the same. Thus, the area of the parallelogram 50 remains constant.

In this second embodiment, pellets must be employed and must be sufficiently large in diameter to enable the arms 70 and 72 and their associated arm extensions 76 and 78 to serve as retaining walls.

Arm extensions fabricated from elastic materials may be substituted for the inelastic extensions and springs.

Obviously many modifications and variations of the present invention are possible in the light of the above teachings. It is therefore to be understood that within the scope of the appended claims the invention may be practiced otherwise than as specifically described.

I claim:

1. A device for physically demonstrating the mathematical formula for the area of an ellipse comprising, a first structure formed with an excised portion therein having an elliptical outline and extending partially therethrough, a second structure formed with an excised portion therein having a quasi-rectangular outline and extending partially therethrough, the excised portion of the second structure being equal in area to the excised portion of the first structure, said structures adapted to be fitted together so that the contiguity of said excised portions forms a communicating passage therebetween, and freely mobile fluid material in sufficient amount to completely occupy the area of said excised elliptical portion, said passage being of sufficient width to permit transfer of said material between said excised portions, and wherein the area of said excised quasi-rectangular portion equals the combined area of four rectangles, each of three of said rectangles having an area equal to one-half the major axis times one-half the minor axis of said elliptical excised portion, and the fourth rectangle having an area equal to one-seventh of the area of any of the other three rectangles.

2. A device as set forth in claim 1, wherein said structures are fabricated from transparent plastic material.

3. A device as set forth in claim 1, wherein said freely mobile material comprises spherical balls.

4. A device for providing a physical demonstration of the mathematical formula for the area of a circle comprising, in combination: a first structure formed with an excised portion therein having a circular outline and extending partially therethrough; a second structure formed with an excised portion therein having a hexagonal outline and extending partially therethrough, the area of said hexagonally outlined excised portion corresponding to the combined areas of three squares and a rectangle, the area of each square being equal to $R^2$ and the area of the rectangle being equal to $\frac{1}{7}R^2$, where R is the radius of said circularly outlined excised portion, and the area of said second structure is equal to the area of the first structure, said structures adapted to be fitted together so that said excised portions communicate with each other; and freely mobile material in sufficient amount to completely occupy the area of said circularly outlined excised portion, the communicating space between said excised portions being of sufficient width to permit transfer of said material therebetween.

5. A device as set forth in claim 4, wherein said freely mobile material comprises spherical pellets.

6. A device as set forth in claim 4, wherein said freely mobile material comprises spherical pellets and the amount of pellets is sufficient to completely cover the circularly outlined excise portion with a single layer.

7. A device as set forth in claim 4, wherein said structures are formed from boards having at least one flat surface from which said excised portions indent.

8. A device as set forth in claim 4, wherein the extent of said circularly outlined excised portion which is occupied is its volume, the boundary of the open side of said volume being the level of the outer surface of said structure, from which outer surface said excised portion indents.

9. A device as set forth in claim 4, wherein said structures are formed from a transparent plastic material, 10. A device as set forth in claim 4, wherein said structures are formed from a transparent plastic material and are coupled permanently together to form an integrated unit.

11. A device as set forth in claim 4, wherein said structures include markings indicating the radius of said circularly outlined excised portion and the boundaries of each of said square and rectangular areas.

12. A device for providing a physical demonstration of the mathematical formula for the area of a parallelogram comprising, in combination: a structure formed with two excised sections extending partially therethrough, one section having a rectangular outline; means in the second section forming an area having a parallelogrammic outline, said means comprising a first, second and third arm and a pair of arm extensions, said first and second arms each pivotally attached at one end to a different end of said third arm, and each of said first and second arms associated with a different one of said arm extensions to form an opposite side of said parallelogrammic area, each said arm extension elastically secured at one end to its associated arm and pivotally secured at its other end to said structure, the distance between the points at which said extensions are pivotally secured corresponding to the base of the parallelogrammic area and being equal to one side of said rectangular area, said third arm forming the side of said parallelogrammic area opposite its base and being slidable, parallelograms of different shape being formed when said third arm is moved, and said base of said parallelogram and an equal side of said rectangle being formed with apertures therein which communicate with each other; means constraining said third arm to slide only along a line parallel to the base of said parallelogram whereby the altitude of said parallelogram remains constant in dimension at all times; and pellets in sufficient amount to completely cover the parallelogrammic area in a single layer, said apertures being of sufficient dimension to permit transfer of said pellets between said areas.

13. A device as set forth in claim 12, wherein said pellets are spherical in shape.

14. A device as set forth in claim 12, including a transparent structure adapted to be placed over the excised sections as a cover therefor, said constraining means comprising a longitudinal slot formed in said cover extending parallel to the base of said parallelogrammic area.

15. A device as set forth in claim 12, including means marking off the altitudes of said parallelogram and said rectangle in terms of dimensional units.

16. A device for providing a physical demonstration of the mathematical formula for a parallelogram comprising, in combination: a structure formed with excised areas extending partially therethrough from an outer surface thereof, one rectangularly shaped and another at least a portion of which is shaped like a parallelogram, the base of said parallelogrammic area being equal to one side of said rectangular area and the altitude of said parallelogrammic area being equal to the side of said rectangular area different from said one side, at least one side of both the rectangular and parallelogrammic areas being formed with an aperture therein said apertures communicating with each other; and freely mobile material in sufficient quantity to completely cover the parallelogrammic area retained in said excised areas, and said communicating apertures being of sufficient dimension to permit transfer of said mobile material.

17. A device as set forth in claim 16, including means marking off the altitude of said parallelogram and the equal side of said rectangle in terms of dimensional units.

18. A device as set forth in claim 16, wherein said freely mobile material comprises spherical pellets.

19. A device as set forth in claim 16, wherein said outer surface of said structure is flat, and including a second structure adapted to be coupled to said flat outer surface as a cover for said excised areas.

References Cited in the file of this patent

UNITED STATES PATENTS

| 296,018 | Kennedy | Apr. 1, 1844 |
| 1,642,236 | Foster | Sept. 13, 1927 |

FOREIGN PATENTS

| 22,006 | Great Britain | of 1903 |
| 529,461 | Great Britain | Nov. 21, 1940 |